United States Patent [19]

Okudaira

[11] Patent Number: 4,787,114
[45] Date of Patent: Nov. 29, 1988

[54] WIPER DRIVING SYSTEM FOR VEHICLE

[75] Inventor: Soichiro Okudaira, Toyota, Japan

[73] Assignee: Toyota Jidosha Kabushiki Kaisha, Toyota, Japan

[21] Appl. No.: 105,659

[22] Filed: Oct. 8, 1987

[30] Foreign Application Priority Data

Oct. 27, 1986 [JP] Japan .................. 61-255499

[51] Int. Cl.$^4$ .................. F16H 21/24; B60S 1/28
[52] U.S. Cl. .................. 15/250.13; 74/40; 74/42; 74/51; 15/250.16
[58] Field of Search .................. 74/40, 42, 51; 15/250.13, 250.16

[56] References Cited

U.S. PATENT DOCUMENTS 2,786,175  3/1957  Rohr .................. 74/51 X
4,614,130  9/1986  Heismann et al. .................. 74/97 X

FOREIGN PATENT DOCUMENTS 1906440   8/1970  Fed. Rep. of Germany ... 15/250.13
59-53255  3/1984  Japan .
61-190758 11/1986 Japan .

OTHER PUBLICATIONS

"Toyota Repair Manual for Chassis & Body-Crown", 1983 Toyota Motor Corporation, pp. BE-26 and BE-27.
Toyota Crown Instruction Manual, Aug. 31, 1983, pp. 6-33 through 6-38.

Primary Examiner—Allan D. Herrmann
Attorney, Agent, or Firm—Cushman, Darby & Cushman

[57] ABSTRACT

A wiper driving system for a vehicle having a wiper link reciprocated by a crank of a motor, and a lever for rotating a driving shaft of a wiper arm fixed to one end of the wiper link by rotating at a predetermined angle with the one end of the wiper link as a fulcrum by the reciprocation of the wiper link which comprises:

an intermediate link interposed between the other end of a first lever of the above-said lever and the wiper link to be pivotally supported to each other, a second lever pivotally supported at its one end to a pivotal shaft for coupling the wiper link to the intermediate link, a switching lever for switching the second lever and the other link connected to the second lever between two positions, said switching lever disposed in a direction crossing the longitudinal direction of the second lever to be pivotally supported to an automotive body, the other end of the second lever being pivotally supported to one end of the switching lever, and a turn-over spring provided at the switching lever for energizing the second lever and the other link connected to the second lever toward any of the two positions through the switching lever. Thus, the switching lever is switched from one to the other positions by a resistance force applied manually or from the wiper arm side, and the wiper blade is varied from a concealed state to a semi-concealed state.

4 Claims, 5 Drawing Sheets

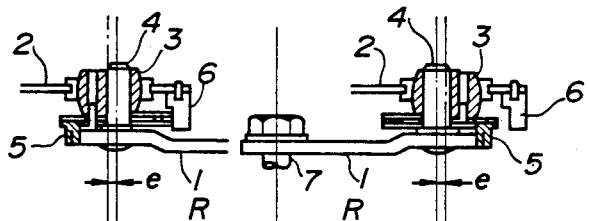
Fig. 4(A) (PRIOR ART)
Fig. 4(B) (PRIOR ART)
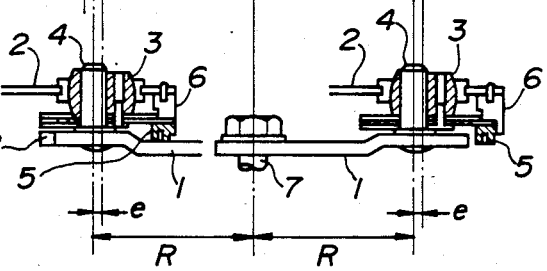
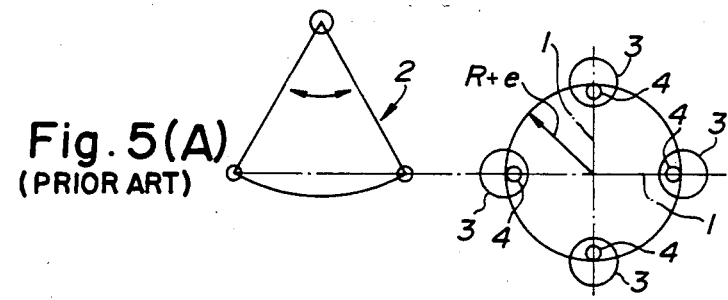
Fig. 5(A) (PRIOR ART)
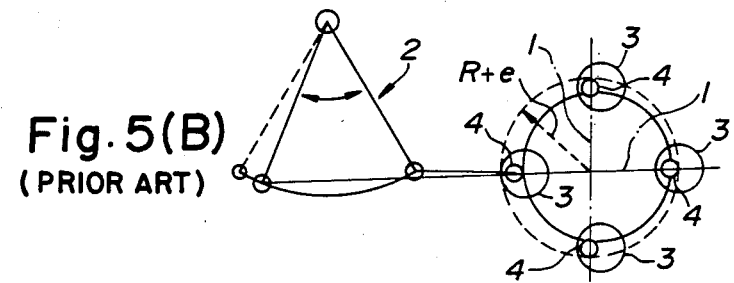
Fig. 5(B) (PRIOR ART)

WIPER DRIVING SYSTEM FOR VEHICLE

BACKGROUND OF THE INVENTION

The present invention relates to a full-concealed wiper driving system for a vehicle and, more particularly, to a wiper driving system for readily switching a switching mechanism for switching a lower returning position of a wiper blade.

In a full-concealed wiper in which wiper arms and a wiper blade are contained under a hood, the wiper arms and the wiper blades are slightly raised from the storage position under the hood to set the position exposed on the hood as the lower returning position, and reciprocatedly wipe a windshield glass between the lower returning position and an upper returning position as ordinarily.

To execute this operation, a height moving down mechanism for moving the wiper arms and the wiper blades from the lower returing position to the storage position is required in additiqn to a mechanism for ordinarily wiping the wiper arms and the wiper blades.

Various type of height moving down mechanisms are heretofore known, but all are complicated in structure and expensive.

Thus, a full-concealed wiper which does not use the height moving down mechanism has been developed. This wiper uses the storage position as a lower returning position to move the wiper arms and the wiper blades to the storage position even in the ordinary wiping operation (Disclosed on pages 6–33 to 38 in the Instruction Manual of Toyota Crown new model issued on Aug. 31, 1983, Japan).

However, when the storage positions of the wiper arms and the wiper blades are thus set at the lower returning positions, there arises a problem that the wiper arms and the wiper blades cannot move to the storage position of the lower returning position when snow stores near the storage position at snow falling time, thereby causing the wipers to be locked.

Therefore, in the full-concealed wiper in which the storage positions are used as the lower returning position, a switching mechanism for switching the position slightly raised from the storage position to the lower returning position at snow falling time is provided to eliminate the locking state of the wipers at the snow falling time.

This switching mechanism is constructed as below.

FIGS. 4(A) and 4(B) show the structure of a coupling section of a crank arm 1 to a link 2 and its operating state. An eccentric bush 3 is provided at the coupling section of the crank arm 1 to the link 2. The eccentric bush 3 is formed substantially in a cylindrical shape to be coupled relatively rotatably with the end of the link 2 on the circumferential surface, and a pin 4 projected at the end of the crank arm 1 is penetrated at the position displaced from the axial center of the cylindrical shape. The pin 4 and the eccentric bush 3 are relatively rotatably coupled with each other. A slider 5 is slidably held at the eccentric bush 3, the slidable end of the slider 5 is selectively engaged with a cutout 42 at the end of the crank arm 1 or a guide 6 at the end of the link 2 to arbitrarily secure the eccentric bush 3 to the crank arm 1 side or the link 2 side.

Thus, as shown in FIG. 4(A), when the slider 5 is engaged with the cutout of the crank arm 1 to fix the eccentric bush 3 to the crank arm 1 side, the eccentric bush 3 relatively rotates to the link 2, but does not relatively rotate to the crank arm 1. Thus, when the output shaft 7 of the wiper motor rotates the crank arm 1 at radius R, the eccentric bush 3 rotates as shown in FIG. 5(A).

When the slider 5 is, on the other hand, engaged with the guide 6 of the link 2 as shown in FIG. 4(B) to secure the bush 3 to the link 2 side, the bush 3 relatively rotates to the crank arm 1, but does not relatively rotate to the link 2. Thus, when the output shaft 7 of the wiper motor rotates the crank arm 1 at a radius R, the bush 3 rotates as shown in FIG. 5(B).

As apparent from the comparison of FIGS. 4(A) and 4(B) with FIGS. 5(A), 5(B), the positions of the bush 3 when the wiper blade is returned at the upper returning position are the same in both FIGS. 5(A) and 5(B), but the positions of the bush 3 when the wiper blade is returned at the lower returning psition are separated at a shorter distance from the output shaft 7 in FIG. 5(B) as compared with that of FIG. 5(A).

As a result, when the slider 5 is engaged with the cutout 42 of the crank arm 1 as shown in FIG. 4(A), the wiper blade 8 is moved to the vicinity of the lowermost end of the windshield 9 as shown in FIGS. 6(A), 7(A) and by 8a in FIG. 8, and the lower returning position of the wiper blade 8 becomes its storage position. In other words, the wiper arm 10 and the wiper blade 8 are stored under the hood 11 at the lower.returning position.

On the other hand, when the slider 5 is engaged with the guide 6 of the link 2 as shown in FIG. 4(B), the wiper blade 8 is moved only to the upper side of the storage position, and the lower returning position of the wiper blade 8 is as shown in FIGS. 6(B) and 7(B) and by 8b in FIG. 8.

However, since this switching mechanism is provided in the coupling section of the crank arm 1 with the link 2, the mechanism is generally disposed in a cowl space inside a compartment from an engine room, it is difficult to switch the slider 5. Thus, as shown in FIG. 9, a small opening 13 is formed at a cowl outer panel 12, a driver 14 is inserted from the opening 13 as shown in FIGS. 10(A), 10(B), 11(A), 11(B) and to switch the slider 5. FIG. 10(A) shows that the sliding end of the slider 5 is engaged with the cutout of the end of the crank arm 1 by the driver 14 FIG. 10(B) that the slider is engaged with the guide 6 of the link 2. FIG. 11(A) shows that the sliding end of the slider 5 is engaged with the guide 6 of the link 2 by the driver 14 FIG. 11(B) that the slider is engaged with the cutout of the end of the crank arm 1. In FIG. 9, reference numeral 19 designates a grommet for ordinarily closing the opening 13.

In addition, since this switching operation moves the slider 5 between the cutout of the end of the crank arm 1 and the guide 6 of the end of the link 2 as described above, this operation can be performed only in the state that both ends are opposed. In other words, the wiper must be operated to be switched by disposing the wiper blade 8 at the upper returning position in a complicated manner.

SUMMARY OF THE INVENTION

Accordingly, an object of the present invention is to provide a wiper driving system for a vehicle which can eliminate the above-mentioned drawbacks of a conventional wiper and which can readily switch a switching mechanism for switching the lower returning position of the wiper blade.

In order to achieve the above object, there is according to one aspect of the present invention a wiper driving system for a vehicle having a switching mechanism for switching a first lower returning position and a second lower returning position higher than the first lower returning position of the wiper comprising an intermediate link interposed between the other end of a first lever having a driving shaft of a wiper arm and a wiper link to be relatively pivotally supported, a second lever pivotally supported at its one end to a pivotal shaft for coupling the wiper link to the intermediate link, a switching lever disposed in a direction crossing the longitudinal direction of the second lever so that the other end of the second lever is pivotally supported to one end of the switching lever, the switching lever being pivotally supported at the intermediate position to an automotive body, and a turn-over spring for energizing the other end of the switching lever.

In this construction as described above, when the switching lever is rotated in a direction for rotating the wiper arm and the wiper blade between the first lower returning position and the upper returning position, the position of the switching lever after the rotation is fixed by the action of the turn-over spring, and the pivotal shafts of the second lever and the switching lever become a fixed point to the automotive body.

On the other hand, the first lever becomes a fixed point to the automotive body at the driving shaft of the wiper arm at one end of the first lever.

Thus, the first and second levers and the intermediate link construct both lever mechanisms. When the reciprocation of the wiper link is transmitted to this mechanism, the first and second levers rotate reciprocatedly at a predetermined angle with the fixed point as a fulcrum.. Thus, the driving shaft of the wiper arm is rotated to rotate the wiper arm and the wiper blade at the same wiping angle as the rotating angle of the first lever between the first lower returning position and the upper returning position.

When the switching lever is reversely switched, the second lever is moved to alter the position of the fixed point of the coupling pivotal shaft with the switching lever. Thus, the coupling pivotal shaft of the wiper link and the intermediate link is moved substantially perpendicularly to the longitudinal direction of the wiper link to increase the angle between the first lever and the intermediate link.

Thus, when the first and second levers rotate around the fixed point similarly to the above, the rotating angle of the first lever becomes particularly smaller than the rotating angel before the switching.

When switching, the first lever is displaced at its one dead point to the other dead point side.

Thus, the wiper arm and the wiper blade rotates reciprocatedly at the narrowed wiping angle between the second lower returning position raised higher than the first lower returning position and the upper returning position.

BRIEF DESCRIPTION OF THE DRAWINGS

The above and other related objects and features of the invention will be apparent from a reading of the following description of the disclosure found in the accompanying drawings and novelty thereof pointed out in the appended claims.

FIG. 4A and 4B are partly fragmentary plan views of a conventional wiper driver;

FIG. 5A and 5B are schematic front view of the driving state of the conventional wiper;

DESCRIPTION OF THE PREFERRED EMBODIMENTS

This invention will now be described in detail with reference to FIGS. 1 to 3, which show an embodiment of a wiper driving system for a vehicle according to this invention.

Figure 3:
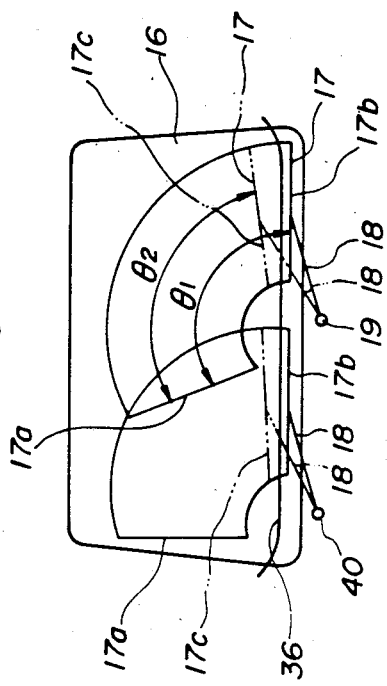
FIG. 3 is a front view of the embodiment in case that the wiper is shown together with a front windshield glass.
Figure 6A:
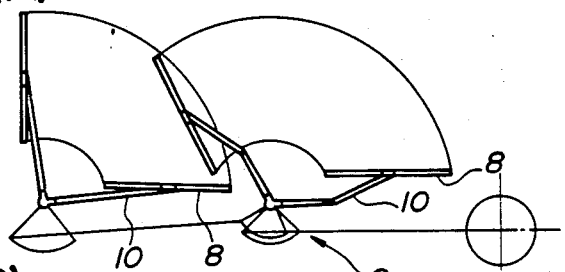
FIG. 6A and 6B are front views showing the operating state of the conventional wiper.
Figure 6B:
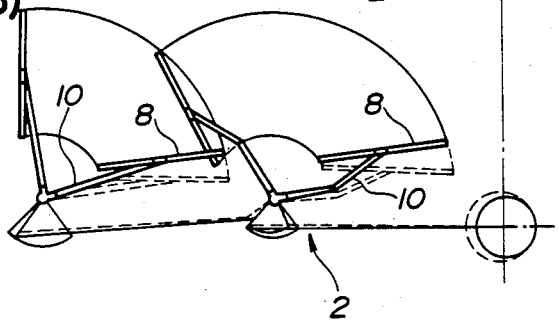
Figure 7A:
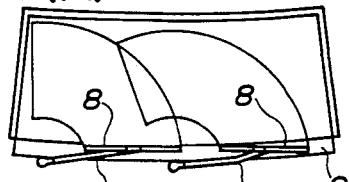
FIG. 7A and 7B are front views showing the conventional wiper disposed at the lower returning position together with a windshield glass.
Figure 7B:
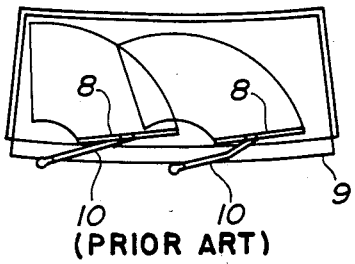
Figure 8:
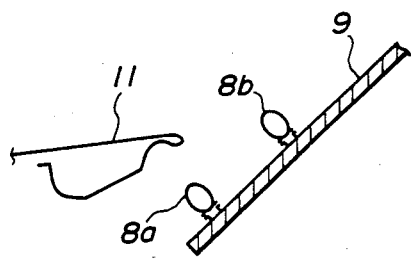
FIG. 8 is a partly fragmentarily vertical sectional view of the wiper.

In FIG. 3, reference numeral 16 designates a front windshield glass, numeral 17 denotes a wiper blade for wiping the surface of the front windshield glass 16, which blade is supported by a wiper arm 18.

Symbol 17a depicts an upper returning position of the wiper blade 17, symbol 17b indicates a first lower returning position, and symbol 17c designates a second lower returning position higher than the first lower returning position. of the wiper blade 17.

Figure 1:
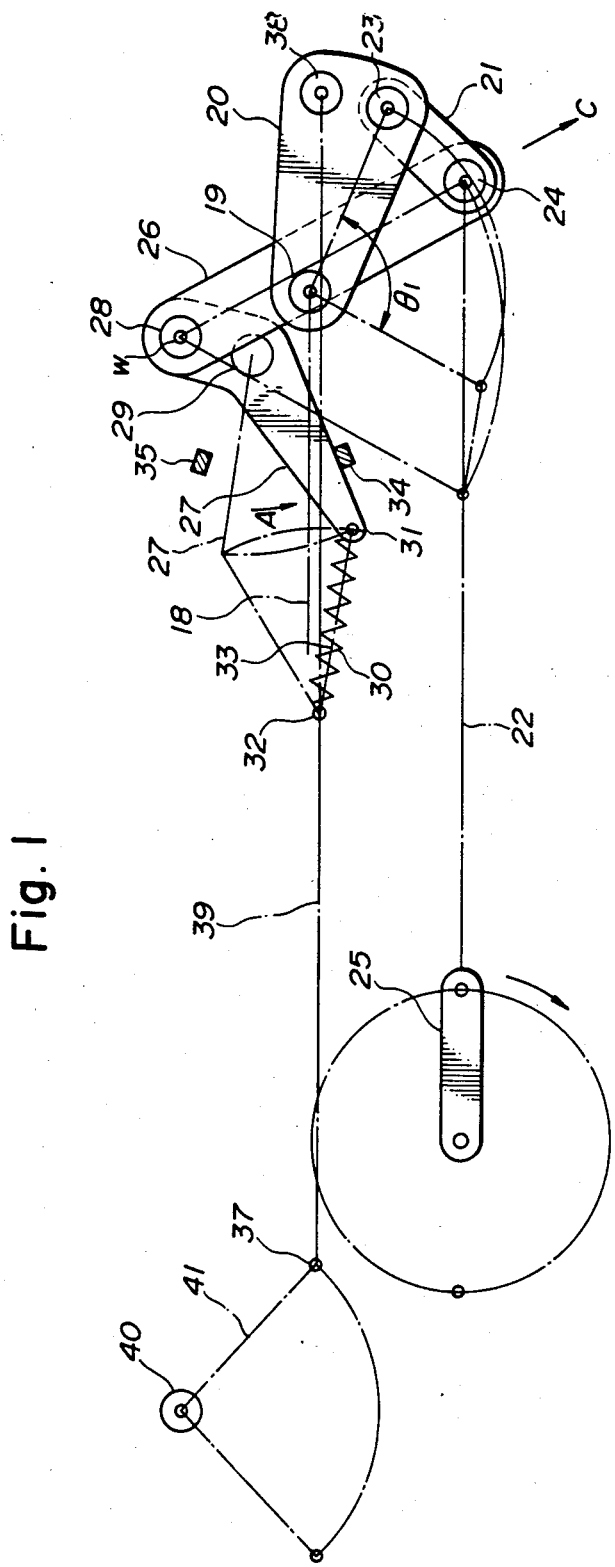
FIG. 1 is a front view showing an embodiment of a wiper driving system according to the present invention in case that the lower returning position of a wiper blade is switched to a first position in a full-concealed state.
Figure 2:
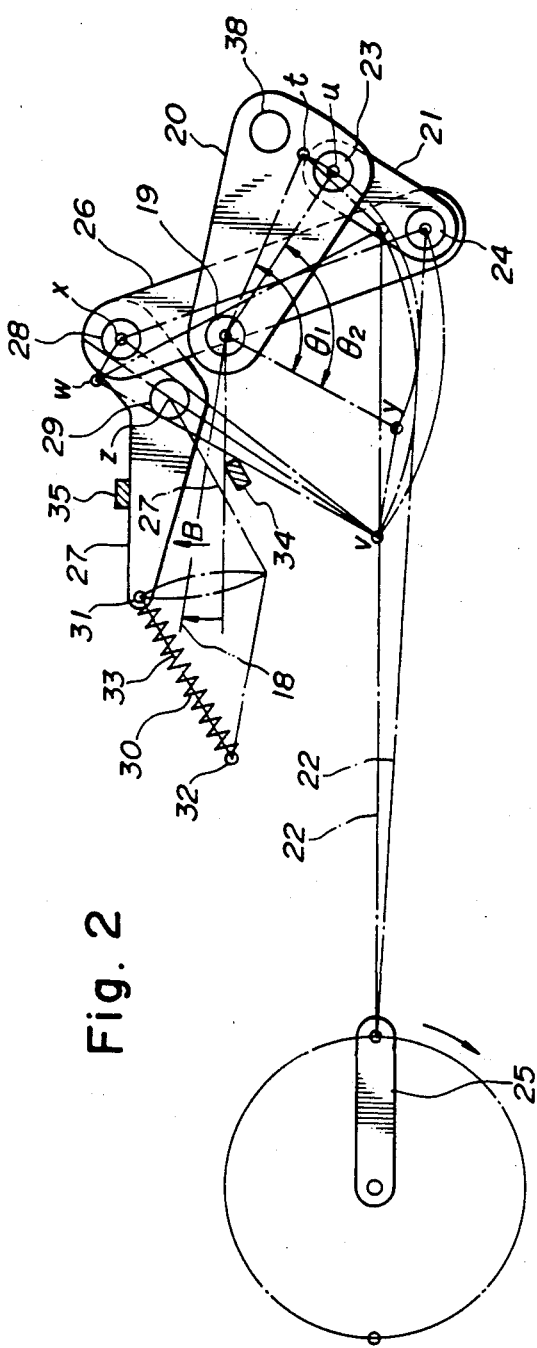
FIG. 2 is a front view of the embodiment in case that the lower returning position of the wiper blade is switched to a second position in a semi-concealed state.

In FIGS. 1 and 2, reference numeral 19 denotes a first driving shaft of the wiper arm 18 for securing the wiper arm 18. The driving shaft 19 is a fixed point with respect to an automotive body and is fixed to one end of a first lever 20.

Figure 9:
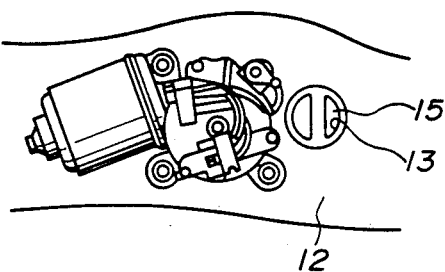
FIG. 9 is a plan view showing a position for switching the lower returning position of the wiper.
Figure 10A:
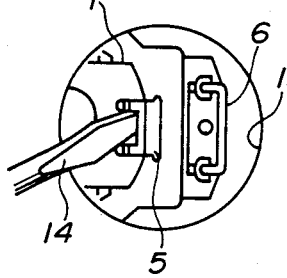
FIGS. 10A, 11A and 11B are plan views showing switching procedure.
Figure 10B:
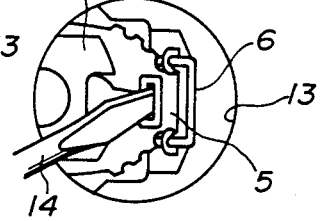
Figure 11A:
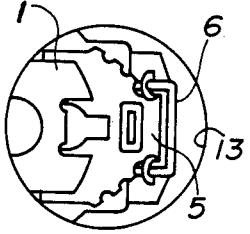
Figure 11B:
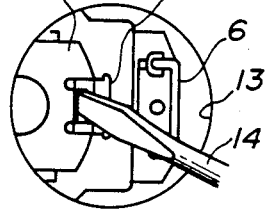

The first lever 20 is pivotally coupled at the other end to one end of an intermediate link 21, and a wiper link 22 is pivotally coupled to the other end of the intermediate link 21. Reference numerals 23 and 24 depict pivotal shafts of the intermediate link 21. The wiper link 22 is pivotally coupled to a crank 25 of a motor FIG. 9).

A second lever 26 is further pivotally supported at one end to the pivotal shaft 24 for coupling the wiper link 22 to the intermediate link 21, and is pivotally supported at its other end to one end of a switching lever 27 disposed in a direction crossing the longitudinal direction of the second lever 26. Numeral 28 indicates the pivotal shaft of the second lever 26.

The switching lever 27 is pivotally supported to a shaft 29 at the intermediate position thereof to the automotive body and is energized at its other end by a turn-over spring 30. The turn-over spring 30 is a compression coil spring in this embodiment, and is inserted into a rod 33 movably engaged with a rotational shaft 32 to extend toward the rotational shaft 32 of a fixed point to the automotive body from the pivotal shaft 31 provided at the other end of the switching lever 27. Numerals 34 and 35 designate stoppers fixed to the automotive body side for the switching lever 27.

Thus, the switching lever 27 can be switched between the two positions as shown in FIGS. 1 and 2. When the switching lever 27 is switched as shown in FIG. 1, the first and second levers 20 and 26, and the intermediate link 21 are moved as a lever mechanism at between the shafts 19 and 28 as a fixed link. When the switching lever 27 is switched as shown in FIG. 2, the first and second levers 20 and 26, and the intermediate link 21 are moved as a lever mechanism at between the shafts 19 and 28 narrowed therebetween as a fixed link.

In this manner, in the state in FIG. 1, the wiper arm 18 fixed to the driving shaft 19 is rotated at a predetermined angle $\theta_1$, and the wiper blade 17 wipes the surface of the windshield glass 16 between the first lower returning position 17b and the upper returning position 17a at the wiping angle $\theta_1$ of the same angle as above, and rotates at a predetermined angle $\theta_2$ in the state in FIG. 2. Thus, the wiper blade 17 wipes between the second lower returning position 17c higher than the first lower returning position 17b and the upper returning position 17a.

Therefore, in case of the full-concealed wiper, the wiper arm 18 and the wiper blade 17 are reversely returned under a hood panel 36 (FIG. 3) in the state in FIG. 1, but are reversely returned out of the hood panel 36 in the state of FIG. 2.

The center Z of the pivotal shaft 29 is set on a bisector of angle wvx when the top dead point of the second lever 26 is designated by v.

Thus, even if the switching lever 27 is switched, the position of the top dead point v of the second lever 26 does not alter even after the switching lever 27 is switched, and the first lever 20 does not almost vary at the position of the top dead point v.

Therefore, the upper returning position 17a of the wiper blade 17 is always constant irrespective of the switching of the switching lever 27. The bottom dead point of the lever 20 moves from t to u. Thus, the lower returning position of the wiper blade 17 is changed from the first lower returning position 17b to the second lower returning position 17c.

The intermediate link is formed relatively short, a coupling pivotal shaft of the second lever to the switching lever is provided relatively near the driving shaft of the wiper arm, the switching lever is extended at the other end along the wiper link, and the turn-over spring extending along the wiper link is coupled to the other end of the switching lever. Thus, the switching lever can be mounted in a narrow space such as in a cowl of a vehicle.

In FIGS. 1 to 3, reference numeral 40 designates a second driving shaft for rotating another wiper arm 18, which becomes a fixed point to the automotive body.

The second driving shaft 40 is fixed to one end of a lever 41, and the other end of the lever 41 and the first lever are pivotally coupled through a link 39. Numerals 37 and 38 denote pivotal shafts for connecting the link 39.

Therefore, the wiper blade 17 of the second driving shaft 40 side moves similarly to the wiper blade 17 as described above.

In the embodiment described above, a link may be independently extended from the crank 25 of the motor, and a mechanism made of the first lever 20 may be interposed to the second driving shaft 40.

In the operation of the wiper driving system constructed as described above to use the wiper, the switching lever 27 is switched as shown in FIG. 1 in an ordinary rainy weather. This operation is readily provided by manually pressing the switching lever 27 in a direction of an arrow A. Then, when the motor is driven, wiper wipes at the wiping angle $\theta_1$ by returning at the first lower returning position 17b as described above.

In case of snowfall, the switching lever 27 is pressed in a direction of an arrow B as shown in FIG. 2, and is switched to the opposite side. When the motor is driven in this state, the wiper wipes at the wiping angle $\theta_2$ by returning at the second lower returning position 17c. However, even if the switching lever is not switched in advance, there is no defect. More specifically, the first lever 20 does not turn due to the resistance of snowfall in the hood panel 36, and with the pivotal shaft 23 as a fulcrum the wiper link 22 tends to further rotate the intermediate link 21. Thus, the second lever 26 is pulled to the opposite direction to the switching lever 27 as designated by an arrow C, with the result that the switching lever 27 is automatically switched to the opposite side.

Since the wiper driving system of the present invention is constructed as described above, the switching mechanism for switching the lower turning positions of the wiper blade is simplified to readily switch the wiper blade.

Since the wiper blade can be automatically switched by utilizing the resistance of snowfall in the hood panel without manual power in the switching operation of the switching lever, the snowfall does not disturb the operation of the wiper.

What we claim is:

1. A wiper driving system for a vehicle having one or more wiper arms, comprising:

a first driving shaft located at a fixed point on an automotive body;

a wiper arm fixed to said shaft;

a wiper link having one end thereof pivotally connected to the crank of a motor for driving a wiper, said wiper link being reciprocated by said crank;

a first lever fixed at one end to said first driving shaft;

an intermediate link having one end pivotally connected to the other end of said wiper link and the other end thereof to the other end of said first lever, said intermediate link transmitting the reciprocation of said wiper link to said first lever so that the latte oscillates said driving shaft to oscillate said wiper arm between upper and lower positions;

a second lever having one end thereof pivotally connected to the pivotal connection between said intermediate link and said wiper link;

a switching lever pivotally mounted at a fixed point on the automotive body and pivotally connected to the other end of said second lever;

stops fixed to the automotive body to limit movement of said switching lever to a predetermined angle between two positons; and turn-over spring means connected to said switching lever and to the automotive body for yieldingly retaining said switching lever in either of said two positons, whereby siad switching lever in one of said two positions limits angular movement of said wiping arm between an upper position and first lower position and in the other of said two positions limits and angular movement of said wiper arm between said upper position and a second lower position.

2. A wiper driving system for a vehicle according to claim 1, wherein the axis of the pivotal support for the switching lever is set on a bisector of angle wvx, where v is the top dead point of the pivotal connection of the second lever with the intermediate link and w, x are centers of the pivotal connection of the switching lever with the second lever at the two positions of the switching lever.

3. A wiper driving system for a vehicle according to claim 1, wherein the intermediate link is relatively short, the pivotal connection between the second lever and the switching lever is relatively near the driving shaft and at one end of said switchng lever and the other end of the switching lever is coupled to the turn-over spring.

4. A driving system for a vehicle according to claim 1, wherein
the vehicle has two wiper arms,
one arm is secured to the first driving shaft,
the other of said arms is secured to a second driving shaft,
a third lever is fixed at one end thereof to said second driving shaft, and
a link is pivotally connected between said first and third levers.

* * * * *